United States Patent [19]

Rouhana et al.

[11] Patent Number: 5,570,933
[45] Date of Patent: Nov. 5, 1996

[54] LAP-SHOULDER BELT EXTENDER

[75] Inventors: Stephen W. Rouhana, Rochester Hills; Edward A. Jedrzejczak, Brown City, both of Mich.

[73] Assignee: General Motors Corporation, Detroit, Mich.

[21] Appl. No.: 362,634

[22] Filed: Dec. 22, 1994

[51] Int. Cl.$^6$ ............................................. B60R 22/00
[52] U.S. Cl. ........................... 297/483; 297/468; 297/482
[58] Field of Search ..................... 297/464, 468, 297/469, 473, 474, 483, 485, 482; 280/801.1, 808

[56] References Cited

U.S. PATENT DOCUMENTS

| | | | |
|---|---|---|---|
| 4,236,755 | 12/1980 | Pollitt et al. | 297/483 |
| 4,319,769 | 3/1982 | Compeau | 280/808 |
| 4,730,875 | 3/1988 | Yoshitsugu | 297/483 X |
| 4,758,048 | 7/1988 | Shuman . | |
| 4,796,915 | 1/1989 | Kaurich et al. . | |
| 5,080,396 | 1/1992 | Vacanti . | |
| 5,135,257 | 8/1992 | Short | 297/483 X |
| 5,215,333 | 6/1993 | Knight | 297/483 X |
| 5,248,187 | 9/1993 | Harrison . | |

FOREIGN PATENT DOCUMENTS

| | | | |
|---|---|---|---|
| 2369948 | 7/1978 | France | 297/483 |
| 2674803 | 10/1992 | France | 280/808 |
| 3132735 | 3/1983 | Germany | 297/483 |
| 53268 | 3/1987 | Japan | 297/483 |
| 242754 | 10/1988 | Japan | 280/808 |

*Primary Examiner*—Milton Nelson, Jr.
*Attorney, Agent, or Firm*—Kathryn A. Marra

[57] ABSTRACT

A seat belt assembly in a vehicle for restraining an occupant includes a lap-shoulder belt assembly and an lap-shoulder belt extender assembly. The lap-shoulder belt includes a shoulder belt having an upper end mounted to the vehicle and a lap belt having a first end mounted to the vehicle and a second end joined to the lower end of the shoulder belt to form a lap-shoulder belt junction. The extender belt includes an extender shoulder belt and an extender lap belt. The extender shoulder belt has an upper extender end adjustably coupled to the shoulder belt. The extender lap belt has a first lap extender end releasably connected to the lap-shoulder belt junction and a second lap extender end connected to a lower extender end of the extender shoulder belt to form an extender junction. The extender junction is releasably connected to the vehicle at the normal location of the lap-shoulder belt junction.

9 Claims, 2 Drawing Sheets

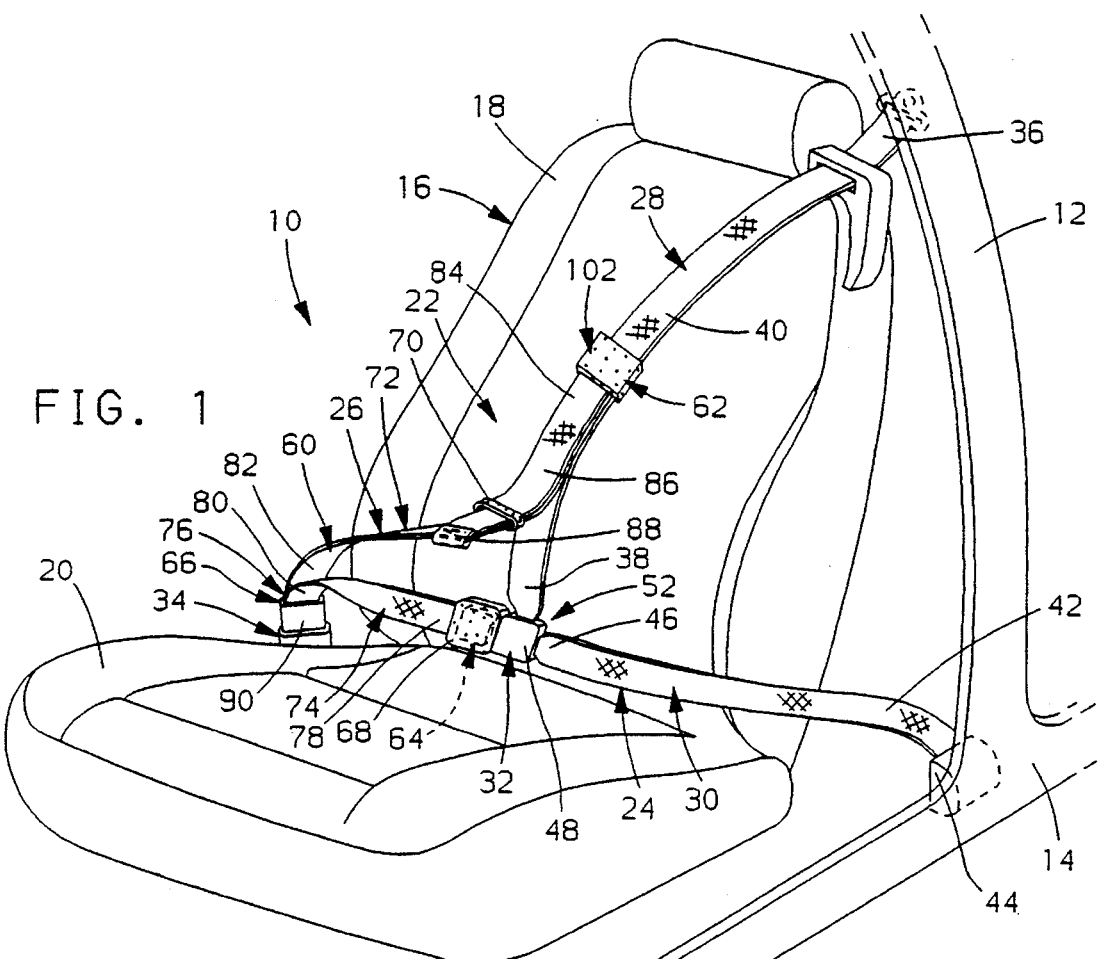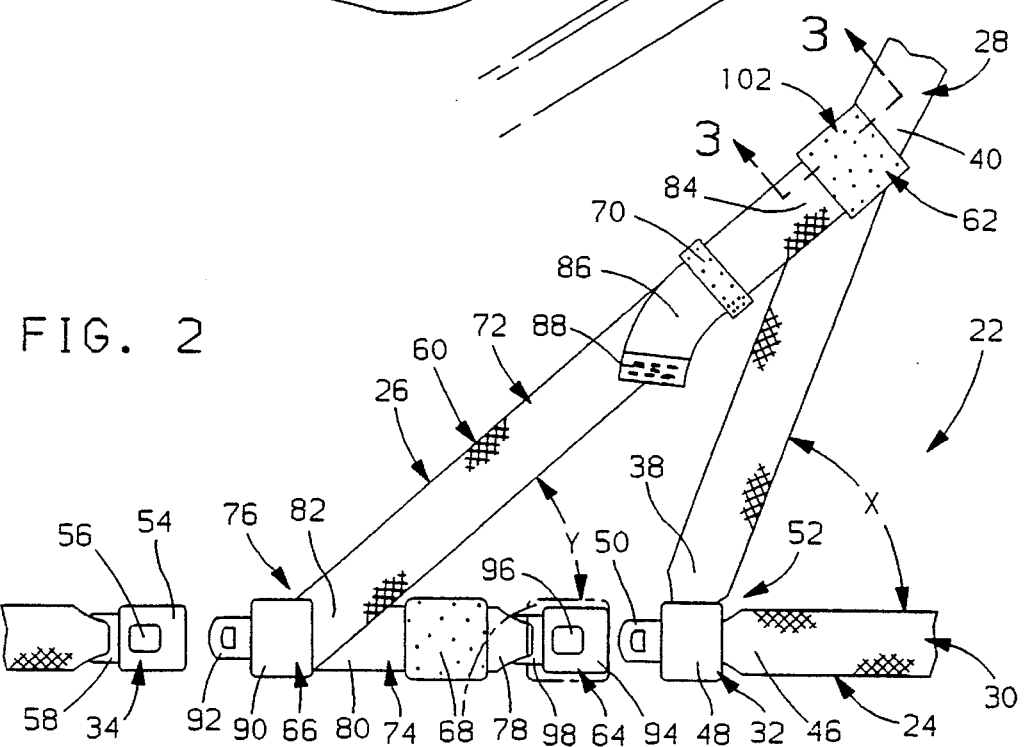

LAP-SHOULDER BELT EXTENDER

The invention relates to a vehicle seat belt assembly, and more particularly to a lap-shoulder belt extender assembly for use with an existing vehicle seat belt assembly.

BACKGROUND OF THE INVENTION

It is well known in motor vehicles to provide a combination lap-shoulder seat belt assembly including a shoulder belt extending at a vertical angle across the torso of an occupant and joining a lap belt which extends generally horizontally across the lap of the occupant. A junction of the shoulder belt and the lap belt typically carries a latch plate assembly which is releasably connected to a buckle assembly anchored to the vehicle.

It is occasionally necessary to provide an extender seat belt assembly to accommodate an occupant of enlarged proportions or one who is significantly greater than the 95th percentile weight anthropometry. It is typical to provide a length of extender webbing with an extender buckle assembly at one end for attachment to the original latch plate assembly and an extender latch plate assembly at the other end for connection with the original buckle assembly. This provides a lap belt extender for accommodating the occupant.

Typically, the length of extender webbing for the lap belt extender is non-adjustable and customized such that each occupant must be measured to determine the needed length of extender webbing. This has the disadvantage of requiring time for a customized extender to be made.

It is also known that extenders should be easy to remove and install, since they should only be used by the intended vehicle occupant.

Extending the lap belt to accommodate the occupant necessarily alters the position of the junction of the shoulder belt and the lap belt of the lap-shoulder belt assembly from the side of the occupant at the buckle assembly towards the center of the occupant. This has the effect of altering the vertical angle of the shoulder belt relative the lap belt to a more vertical angle.

SUMMARY OF THE INVENTION

This invention provides an improved seat belt assembly including a lap-shoulder belt assembly and a lap-shoulder belt extender assembly. Advantageously, the extender assembly is adjustable and can be used to accommodate a variety of passengers, thus eliminating the need to measure the passenger and make customized extender assemblies. This extender assembly is also easily assembled and disassembled from the lap-shoulder belt assembly so that the extender assembly can easily be removed when an occupant does not require the extender assembly.

The present invention preferably accomplishes these advantages by providing the lap-shoulder belt assembly including a shoulder belt and a lap belt and the extender assembly including an extender shoulder belt and an extender lap belt. The shoulder belt has an upper end mounted to the vehicle and a lower end. The lap belt has a first end mounted to the vehicle and a second end joined to the lower end of the shoulder belt to form a lap-shoulder belt junction. The extender shoulder belt has an upper extender end and a lower extender end. The upper extender end is adjustably coupled to the shoulder belt at an intermediate portion of the shoulder belt between the upper and lower ends of the shoulder belt. The extender lap belt has a first lap extender end releasably connected to the lap-shoulder belt junction and a second lap extender end connected to the lower extender end of the extender shoulder belt to form an extender junction. The extender junction is releasably connected to the vehicle.

Thus, the extender lap belt advantageously extends the length of the original lap belt. Also, the extender shoulder belt and shoulder belt cooperatively provide dual shoulder belts having spaced apart lower ends for restraining the occupant. In addition, the extender junction is advantageously connected to the vehicle at the original location of the lap-shoulder belt junction.

The present invention also preferably adjustably couples the extender shoulder belt to the shoulder belt by use of a coupler unit. The coupler unit includes a coupler base including a plate portion having two spaced apart apertures and a coupler cover attached to the coupler base. The coupler unit also includes a pair of locking bars each positioned between the coupler cover and the coupler base and aligned at least partially above one of the apertures. One of the locking bars is fixedly captured by the coupling unit and the other locking bar is slidably captured by the coupling unit. Preferably, the shoulder belt extends through one of the apertures and loops around one of the locking bars to be fixedly trapped within the coupler unit. The extender shoulder belt extends through the other aperture and loops around the other locking bar to be slidably captured within the coupler unit.

BRIEF DESCRIPTION OF THE DRAWINGS

These and other features, objects, and advantages of the present invention will become apparent upon consideration of the following description of the preferred embodiment, appended claims, and accompanying drawings in which:

FIG. 1 is a perspective view of a seat belt assembly including an adjustable lap-shoulder belt extender assembly attached to an original lap-shoulder belt assembly in a vehicle;

FIG. 2 is a front partially-exploded view of the seat belt assembly broken away from the vehicle;

DESCRIPTION OF THE PREFERRED EMBODIMENT

Figure 3:
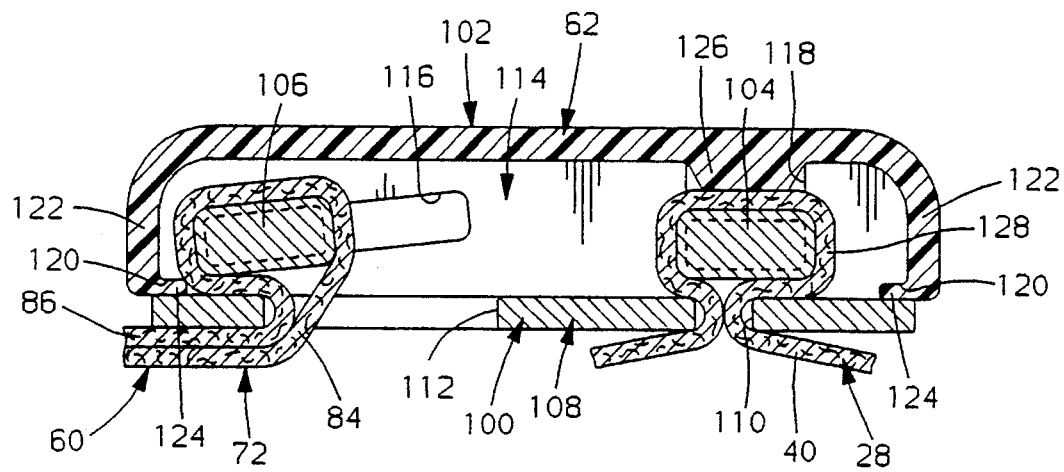
FIG. 3 is a cross-sectional view taken along line 3—3 of FIG. 2 and showing the coupler unit in the assembled condition.

Referring to FIG. 1, it is seen that a vehicle 10 includes a side structure 12 and a lower structure 14. The vehicle 10 also includes a seat 16 for an occupant including a seat back portion 18 and a seat cushion portion 20 conventionally mounted to the lower structure 14 of the vehicle 10. The vehicle 10 has a seat belt assembly 22 including an original lap-shoulder belt assembly 24 and an adjustable extender lap-shoulder belt assembly 26.

The lap-shoulder belt assembly 24 is originally provided in the vehicle 10 and may be of any conventional construction. The lap-shoulder belt assembly 24 includes a shoulder belt 28, a lap belt 30, a latch plate assembly 32, and a buckle assembly 34.

As best shown in FIG. 1, the shoulder belt 28 is made from suitable webbing material and includes an upper end 36 suitably mounted to the vehicle 10, such as by attachment to the vehicle side structure 12 or the vehicle seat 16. The shoulder belt 28 also includes a lower end 38 suitably joined to the lap belt 30 at the latch plate assembly 32 and an intermediate portion 40 between the upper and lower ends 36, 38, as will be described further hereinafter.

The lap belt 30 is made from a suitable webbing material and includes a first end 42 mounted to the vehicle 10, such as by attachment to a retractor mechanism 44 anchored to the lower structure 14 or seat 16 of the vehicle 10. The lap belt 30 includes a second end 46, opposite the first end 42, which is suitably joined to the lower end 38 of the shoulder belt 28 at the latch plate assembly 32.

Referring to FIGS. 1 and 2, the latch plate assembly 32 includes a connector portion 48 and a latch plate 50. The connector portion 48 of the latch plate assembly 32 is attached to both the lower end 38 of the shoulder belt 28 and the second end 46 of the lap belt 30. A junction 52 of the lap-shoulder belt assembly 24 is defined where the lower end 38 of the shoulder belt 28 and the second end 46 of the lap belt 30 are suitably joined at the connector portion 48 of the latch plate assembly 32.

As best shown in FIG. 2, the shoulder belt 28 and the lap belt 30 are each a separate piece of webbing having the lower end 38 and second end 46 joined to the connector portion 48 of latch plate assembly 32, respectively. It will be appreciated that the lap belt 30 and shoulder belt 28 may also be provided as a single piece of webbing having the connector portion 48 of the latch plate assembly 32 slidably connected at the junction 52 of the shoulder and lap belts 28, 30, as is known in the art.

A shoulder belt angle X is defined between the vertically inclined shoulder belt 28 relative to the generally horizontally extending lap belt 30 of the lap-shoulder belt assembly 24.

The buckle assembly 34 may be of any conventional construction and includes a receptacle portion 54 including a release button 56 and adapted to releasably receive the latch plate 50 of the latch plate assembly 32 therein. The buckle assembly 34 further includes a buckle plate 58 extending from the receptacle portion 54. The buckle assembly 34 is suitably mounted to the vehicle 10, such as by attachment to the lower structure 14 or seat 16 via the buckle plate 58, as is well known in the art.

The adjustable lap-shoulder belt extender assembly 26 includes an extender webbing 60, a coupler unit 62, an extender buckle assembly 64, and an extender latch plate assembly 66. A slidable buckle cover 68 and a slidable webbing retainer clip 70 are preferably included with the extender assembly 26.

Referring to FIGS. 1 and 2, the extender webbing 60 is preferably a single length of suitable seat belt webbing material. The extender webbing 60 includes an upper vertically inclined extender shoulder belt 72 and a lower generally horizontally extending extender lap belt 74. An extender junction 76 is defined at the intersection of the extender shoulder belt 72 and the extender lap belt 74.

The extender lap belt 74 extends between the latch plate assembly 32 and the buckle assembly 34 of the original lap-shoulder seat belt assembly 24. The extender lap belt 74 includes a first extender end 78 releasably connected to the second end 46 of the lap belt 30 and the lower end 38 of the shoulder belt 28 at the junction 52 of the original lap-shoulder belt assembly 24. The extender lap belt 74 includes a second extender end 80 located at the extender junction 76 and connected to a lower extender end 82 of the extender shoulder belt 72 and releasably connected to the extender buckle assembly 64, as will be described further hereinafter. A generally horizontally extending elongated lap belt is cooperatively provided by the lap belt 30 of the lap-shoulder belt assembly 24 and the extender lap belt 74 of the extender assembly 26.

The extender shoulder belt 72 of the extender assembly 26 includes an upper extender end 84 coupled to the intermediate portion 40 of the shoulder belt 28 of the lap-shoulder belt assembly 24 by the coupler unit 62, as will be described further hereinafter. The extender shoulder belt 72 includes the lower extender end 82 located at the extender junction 76 and releasably connected to the buckle assembly 34 of the original lap-shoulder belt assembly 24. An extender shoulder belt angle Y is defined between the vertically inclined extender shoulder belt 72 relative to the generally horizontally extending extender lap belt 74.

The extender shoulder belt 72 further includes an adjustable overlapped portion 86 extending downwardly from the upper extender end 84 and partially overlying the remainder of the extender shoulder belt 72. The overlapped portion 86 of the extender webbing 60 has a free end 88 which is suitably folded over and stitched.

The extender latch plate assembly 66 may be a conventional adjustable/cinching latch plate assembly and includes an extender connector portion 90 and an extender latch plate 92. The extender connector portion 90 is slidably connected to the extender webbing 60 at the extender junction 76. It will be appreciated that the location of the extender junction 76, and thus the length of the extender lap belt 24, may be adjusted by simply sliding the location of the extender latch plate assembly 66 relative to the extender webbing 60.

The extender buckle assembly 64 is fixedly connected to the first extender end 78 of the extender lap belt 74 for releasably connecting the extender lap belt 74 to the junction 52 of the lap-shoulder belt assembly 24 via releasable connection with the latch plate assembly 32. More particularly, the extender buckle assembly 64 preferably has construction similar to the buckle assembly 34 and includes an extender receptacle portion 94 including a release button 96 and an extender buckle plate 98 fixedly connected to the first extender end 78 of the extender lap belt 74. The extender receptacle portion 94 is adapted for releasably receiving the latch plate 50 of the latch plate assembly 32, therein.

Since the buckle assembly 34 and the extender buckle assembly 64 preferably have similar constructions, and since the latch plates 50, 92 of the latch plate assembly 32 and extender latch plate assembly 66 preferably have similar constructions, the latch plate assembly 32 may be directly releasably connected to the either the buckle assembly 34 or the extender buckle assembly 64. Thus, it will be appreciated that the extender junction 76 of the extender assembly 26 is located at an original location of the junction 52 of the lap-shoulder belt assembly 24 connected to the buckle assembly 34.

Figure 4:
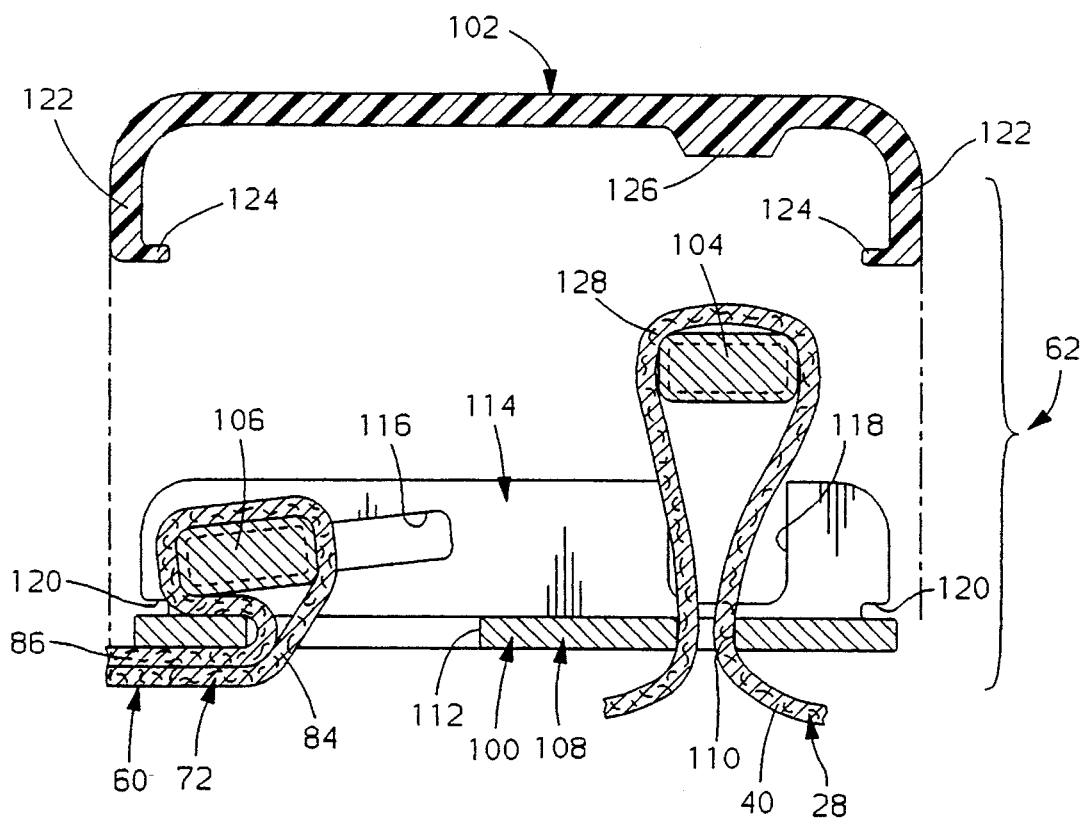
FIG. 4 is a view similar to FIG. 3 but showing a partially exploded view of the coupler unit.

Referring to FIGS. 3 and 4, the coupler unit 62 includes a coupler base 100, a coupler cover 102, a first locking bar 104, and a second locking bar 106. The coupler base 100 includes a generally rectangular base plate 108, preferably made of metal, and having first and second transversely extending apertures 110, 112 which are longitudinally spaced apart. The first aperture 110 is sized for closely receiving the intermediate portion 40 of the shoulder belt 28 of the lap-shoulder belt assembly 24 therethrough, as will be described further hereinafter. The second aperture 112 is sized larger than the first aperture 110 and receives the overlapped portion 86 of the extender shoulder belt 72 of the extender webbing 60 therethrough, as will also be described further hereinafter.

The coupler base 100 includes transversely spaced apart upstanding side walls 114 extending upwardly from the base plate 108 of the coupler base 100. With reference to the longitudinal or left to right orientation shown in FIGS. 3 and 4, the left portions of side walls 114 include transversely opposed elongated inclined slots 116. The inclined slots 116 are vertically aligned at least partially over the second aperture 112 in the base plate 108 and at least partially leftward of the second aperture 112 in the base plate 108.

Also with reference to FIGS. 3 and 4, the right portions of the side walls 114 include transversely opposed recesses 118 which open vertically upward on the upper edge of the side walls 114 opposite the base plate 108. The recesses 118 are vertically aligned with the first aperture 110 in the base plate 108 and have a longitudinal width larger than the first aperture 110 in the base plate 108. The side walls 114 each further include a pair of longitudinally opposed notches 120 adjacent the base plate 108 for snap-fitted engagement with the coupler cover 102, which will now be described.

The coupler cover 102 is preferably a single component molded of a suitable polymeric material. The coupler cover 102 is a generally rectangular plate which is sized approximately equal to the base plate 108 and includes downwardly extending edge flanges 122 having inwardly projecting fingers 124 for snap-fitted engagement with the pairs of notches 120 on the side walls 114 of the base plate 108. The coupler cover 102 further includes an integral transversely extending protrusion 126 vertically aligned with the opposing recesses 118 in the side walls 114.

The first and second locking bars 104, 106 are both preferably identical metal rods having an elongated cross-section. The first and second locking bars 104, 106 have a transverse length approximately equivalent to the transverse length of the base plate 108. The first locking bar 104 has slightly reduced ends seated in the recesses 118 in the side walls 114 and the second locking bar 106 has opposing reduced ends captured in the inclined slots 116 in the side walls 114. The intermediate cross-section of the locking bars 104, 106 is slightly larger than the ends to prevent axial removal of the locking bars 104, 106 from their respective inclined slots 116 or recesses 118. The recesses 118 preferably have a longitudinal width sized for closely receiving the ends of first locking bar 104 therein so that longitudinal movement of the first locking bar 104 is minimized. The inclined slots 116 preferably have a vertical height sized for closely receiving the ends of the second locking bar 106 therein and a longitudinal width sized greater than the elongated cross-section of the second locking bar 106 such that the second locking bar 106 is capable of longitudinal sliding movement within the inclined slots 116.

The extender assembly 26 is assembled as follows. The second locking bar 106 is preassembled to the base plate 108 such that the reduced ends of the second locking bar 106 are captured in the inclined slots 116 permitting longitudinal sliding movement of the second locking bar 106 within the inclined slots 116. The free end 88 of the extender shoulder belt 72 is pulled up through the second aperture 112, looped around the second locking bar 106, and pulled back out through the second aperture 112. Thus, the upper extender end 84 of the extender shoulder belt 72 is attached to the coupler unit 62 and the overlapping portion 86 and free end 88 partially overlie the remainder of the extender shoulder belt 72.

The extender assembly 26 preferably includes the sliding webbing retainer clip 70 for clipping the overlapping portion 86 of the extender shoulder belt 72 to the remainder of the extender shoulder belt 72. The clip 70 is preferably made of a plastic material and slidably engages the extender shoulder belt 72 of the extender assembly 26.

The extender assembly 26 is easily assembled to the lap-shoulder belt assembly 24 as follows. Referring to FIG. 4, the intermediate portion 40 of the shoulder belt 28 of the lap-shoulder belt assembly 24 is folded to form a loop 128 and is inserted up through the first aperture 110 of the base plate 108. Then the first locking bar 104 is inserted through the loop 128 formed by the intermediate portion 40. The loop 128 is then pulled towards the base plate 108 such that the reduced ends of the first locking bar 104 are seated in the opposed recesses 118 in the side walls 114 of the base plate 108. Next, the inwardly extending fingers 124 of the coupler cover 102 are snapped into the notches 120 on the side walls 114 so that the coupler unit 62 is fully assembly as shown in FIG. 3. It will be appreciated that the position of the coupler unit 62 relative the shoulder belt 28 must be adjusted prior to snapping on the coupler cover 102.

In the assembled condition shown in FIG. 3, the loop 128 of the intermediate portion 40 of the shoulder belt 28 is interposed between the protrusion 126 on the coupler cover 102 and the first locking bar 104 such that sliding movement of the coupler unit 62 relative to the shoulder belt 28 of the lap-shoulder belt assembly 24 is prevented. To complete assembly of the extender assembly 26 to the lap-shoulder belt assembly 24, the latch plate 50 of the lap-shoulder belt assembly 24 is snapped into the extender receptacle portion 94 of the extender buckle assembly 64.

The extender assembly 26 also preferably includes the slidable extender buckle cover 68 which is slidably connected to the extender lap belt 74 of the extender assembly 26 and preferably is made of a plastic material. The extender buckle cover 68 covers the release button 96 on the extender receptacle portion 94 of the extender buckle assembly 64 to prevent the occupant from normally disconnecting the extender assembly 26 at the extender junction 76 during normal vehicle 10 use.

After the extender assembly 26 is assembled to the lap-shoulder belt assembly 24, the occupant during vehicle use secures the seat belt assembly 22 by inserting the extender latch plate 92 into the receptacle portion 54 of the buckle assembly 34. The occupant removes the seat belt assembly 22 by pressing the release button 56 on the buckle assembly 34 to release the extender latch plate 92 from the buckle assembly 34.

The extender assembly 26 may be adjusted by the occupant in two ways. First, the extender latch plate 92 may be slid along the extender webbing 60 to adjust the length of the extender lap belt 74 to the appropriate length necessary. In addition, the extender shoulder belt 72 may be adjusted by sliding the coupler unit 62 along the extender webbing 60 to adjust the length of the extender shoulder belt 72 to the appropriate length needed. More particularly, to adjust the length of the extender shoulder belt 72, the coupler unit 62 is tilted such that the second locking bar 106 is biased rightward with respect to FIGS. 3 and 4 within the inclined slots 116 to permit sliding movement of the coupler unit 62 relative the extender webbing 60. After the extender shoulder belt 72 is adjusted, the second locking bar 106 is returned to its normal position in the inclined slots 116, shown in FIGS. 3 and 4, such that the extender webbing 60 is cinched between the second locking bar 106 and the coupler base 108.

Once the adjustments are made, the sliding webbing retainer clip 70 may be slid along the extender shoulder belt 72 towards the free end 88 to prevent the overlapping portion 86 of the extender shoulder belt 72 from free movement relative the remainder of the extender shoulder belt 72.

When the vehicle 10 experiences a deceleration event such as hard braking or impact, the shoulder belt 28 and extender shoulder belt 72 are loaded causing the first and second locking bars 104, 106 to tightly cinch and lock the shoulder belts 28, 72 in place to restrain the occupant.

The extender assembly 26 is easily disassembled from the lap-shoulder belt assembly 24 as follows. The extender latch plate 92 is disengaged from the buckle assembly 34. The buckle cover 68 is slid away from the extender buckle assembly 64, such as to the solid-line position shown in FIG. 2, to allow access to the release button 96 on the extender receptacle portion 94 of the extender buckle assembly 64. Then the latch plate 50 of the original latch plate assembly 32 is released from the extender buckle assembly 64. The coupler unit 62 is removed by popping off the coupler cover 102 by a suitable tool, such as a screwdriver, pulling the first locking bar 104 up out of the recesses 118, sliding the first locking bar 104 out of the loop 128 of the shoulder belt 28, and pulling the loop 128 of the shoulder belt 28 downwardly out through the first aperture 110 such that the entire coupler unit 62 is separated from the shoulder belt 72. In this manner, the extender assembly 26 is easily disassembled from the lap-shoulder belt assembly 24.

The extender shoulder belt 72 of the extender assembly 26 and the shoulder belt 28 of the lap-shoulder belt assembly 24 provide dual vertically inclined shoulder belts 28, 72. As shown in FIGS. 1 and 2, the extender shoulder belt angle Y is less than the shoulder belt angle X of the lap-shoulder belt assembly 24. In essence, the extender shoulder belt assembly 26 provides the extender shoulder belt 72 having a vertically inclined extender shoulder belt angle Y which is closer to the angle of the shoulder belt 28 prior to assembly of the extender assembly 26. While the original junction 52 position of the lap-shoulder belt assembly 24 is still necessarily moved towards the center of the passenger, the additional extender junction 76 is connected to the original buckle assembly 34. Thus, the extender shoulder belt 72 provides an additional shoulder belt which also advantageously maintains the original junction location of the shoulder belt 28 of the lap-shoulder belt assembly 24 with the original buckle assembly 34.

Thus, this invention provides an adjustable lap-shoulder extender assembly 26. The extender assembly 26 advantageously provides an extender shoulder belt 72 for dual shoulder belt torso restraint. The extender shoulder belt 72 advantageously has an extender junction 76 located at the original lap-shoulder belt junction location with the original buckle assembly 34. The extender assembly 26 is easily assembled and disassembled from the lap-shoulder belt assembly 24 so that the extender assembly 26 can easily be removed when an occupant does not require the extender assembly 26. The extender assembly 26 also has the advantage of utilizing a single doubly adjustable length of extender webbing 60 so that one extender assembly 26 can be stocked to accommodate a variety of occupants. This eliminates the need to measure the occupant and make customized extender assemblies.

It will be understood that a person skilled in the art may make modifications to the preferred embodiment shown herein within the scope and intent of the claims. For example, although the preferred embodiment describes the extender webbing as a single piece of webbing, it is also contemplated that the extender webbing could be provided as two pieces of webbing, one being the extender shoulder belt and the other being the extender lap belt, each attached to the extender latch plate assembly.

While the present invention has been described as carried out in a specific embodiment thereof, it is not intended to be limited thereby but is intended to cover the invention broadly within the scope and spirit of the appended claims.

The embodiments of the invention in which an exclusive property or privilege is claimed are defined as follows:

1. A seat belt assembly in a vehicle for restraining an occupant comprising:

a lap-shoulder belt assembly including a shoulder belt and a lap belt;

the shoulder belt having an upper end mounted to the vehicle and a lower end;

the lap belt having a first end mounted to the vehicle and a second end joined to the lower end of the shoulder belt to form a lap-shoulder belt junction;

a lap-shoulder belt extender assembly including an extender shoulder belt and an extender lap belt;

the extender shoulder belt having an upper extender end and a lower extender end, the upper extender end adjustably coupled to the shoulder belt at an intermediate portion of the shoulder belt between the upper and lower ends of the shoulder belt;

the extender lap belt having a first lap extender end releasably connected to the lap-shoulder belt junction and a second lap extender end connected to the lower extender end of the extender shoulder belt to form an extender junction; and means for releasably connecting the extender junction to the vehicle;

whereby the extender lap belt extends the lap belt of the lap-shoulder belt assembly, the extender shoulder belt and shoulder belt cooperatively provide dual shoulder belts for restraining the occupant, and the shoulder belt and extender shoulder belt are spaced apart at their lower ends by the extender lap belt.

2. The seat belt assembly of claim 1 wherein the means for releasably connecting the extender junction to the vehicle includes a buckle assembly anchored to the vehicle and a latch plate assembly fixedly connected to the extender junction and releasably connected to the buckle assembly.

3. The seat belt assembly of claim 1 wherein the extender shoulder belt and the extender lap belt are made from a single length of webbing material.

4. The seat belt assembly of claim 1 wherein the lap belt and extender lap belt extend in a generally horizontal direction, wherein the shoulder belt extends at a first vertically inclined angle relative the lap belt, wherein the extender shoulder belt extends at a second vertically inclined angle relative the extender lap belt, and wherein the first vertically inclined angle is greater than the second vertically inclined angle.

5. The seat belt assembly of claim 1 wherein the extender shoulder belt is adjustably coupled to the shoulder belt by a coupler unit comprising a coupler base including a plate portion having first and second spaced apart apertures, the coupler base including opposed upstanding side walls each including a recess aligned above the first aperture and an elongated inclined slot partially aligned above the second aperture, a coupler cover attached to the coupler base, first and second locking bars, the first locking bar having ends closely captured in the recesses of the side walls, the second locking bar having ends slidably captured in the elongated inclined slots of the side walls, and wherein the shoulder belt extends through the first aperture and loops around the first locking bar to be fixedly trapped between the first locking bar and one of the coupler cover and coupler base, the extender shoulder belt extends through the second aperture and loops around the second locking bar to be adjustably captured between the second locking bar and the coupler base.

6. A seat belt assembly in a vehicle for restraining an occupant comprising:

a lap-shoulder belt assembly including a shoulder belt, a lap belt, and a junction of the shoulder belt and lap belt;

a buckle assembly anchored to the vehicle;

a latch plate assembly connected to the junction and the junction normally releasably connected to the buckle assembly via the latch plate assembly;

a lap-shoulder extender belt assembly including an extender shoulder belt having an upper end and a lower end, the upper end including means for adjustably coupling the upper end to the shoulder belt;

an extender lap belt having a first end including means for connecting the first end to the latch plate assembly and having a second end connected to the lower end of the extender shoulder belt to form an extender junction; and means connected to the extender junction for releasably connecting the extender junction to the buckle assembly;

whereby the extender lap belt extends the lap belt of the lap-shoulder belt assembly, the extender shoulder belt and shoulder belt cooperatively provide dual shoulder belts for restraining the occupant, and the extender junction is releasably connected to the buckle assembly at a normal location of the junction of the lap-shoulder belt assembly.

7. The seat belt assembly of claim 6 wherein the means for connecting the first end of the extender lap belt to the latch plate assembly includes an extender buckle assembly fixedly connected to the first end of the extender lap belt and releasably connected to the latch plate assembly.

8. The seat belt assembly of claim 7 further including a sliding buckle cover slidably connected to the extender lap belt for selectively covering the extender buckle assembly.

9. The seat belt assembly of claim 6 wherein the means for adjustably coupling the upper end of the extender shoulder belt to the shoulder belt is a coupler unit comprising a coupler base including a plate portion having first and second spaced apart apertures, the coupler base including opposed upstanding side walls each including a recess aligned above the first aperture and an elongated inclined slot partially aligned above the second aperture, a coupler cover attached to the coupler base, first and second locking bars, the first locking bar having ends closely captured in the recesses of the side walls, the second locking bar having ends slidably captured in the elongated inclined slots of the side walls, and wherein the shoulder belt extends through the first aperture and loops around the first locking bar to be fixedly trapped between the first locking bar and one of the coupler cover and base, the extender shoulder belt extends through the second aperture and loops around the second locking bar to be adjustably captured between the second locking bar and the coupler base.

* * * * *